United States Patent
Kanda et al.

(10) Patent No.: US 11,635,373 B2
(45) Date of Patent: Apr. 25, 2023

(54) INFORMATION PROCESSING APPARATUS, INFORMATION PROCESSING METHOD, PROGRAM, AND MONITORING SYSTEM

(71) Applicant: JAPAN AEROSPACE EXPLORATION AGENCY, Tokyo (JP)

(72) Inventors: Atsushi Kanda, Tokyo (JP); Kazuki Hashimoto, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 343 days.

(21) Appl. No.: 16/757,900

(22) PCT Filed: Aug. 29, 2018

(86) PCT No.: PCT/JP2018/031949
§ 371 (c)(1),
(2) Date: Apr. 21, 2020

(87) PCT Pub. No.: WO2019/082504
PCT Pub. Date: May 2, 2019

(65) Prior Publication Data
US 2020/0340914 A1    Oct. 29, 2020

(30) Foreign Application Priority Data
Oct. 27, 2017    (JP) .............................. JP2017-208077

(51) Int. Cl.
*G01N 21/47* (2006.01)
*G01B 11/06* (2006.01)
(Continued)

(52) U.S. Cl.
CPC .............. *G01N 21/47* (2013.01); *B60T 8/171* (2013.01); *B60T 8/172* (2013.01); *B60W 40/06* (2013.01);
(Continued)

(58) Field of Classification Search
CPC .. G08G 5/0021; G08G 5/0026; G08G 5/0086; G08G 5/0091; G08G 5/02;
(Continued)

(56) References Cited

U.S. PATENT DOCUMENTS

| 4,797,660 A | * | 1/1989 | Rein, Jr. | ................ G08B 19/02 244/134 F |
| 5,218,206 A | * | 6/1993 | Schmitt | ............... B60R 16/0237 250/341.8 |

(Continued)

FOREIGN PATENT DOCUMENTS

| EP | 2 696 195 A2 | 2/2014 |
| JP | 62-217144 A | 9/1987 |

(Continued)

OTHER PUBLICATIONS

Office Action dated Dec. 23, 2021 in Japanese Application No. 2017-208077.

(Continued)

*Primary Examiner* — Gordon J Stock, Jr.
(74) *Attorney, Agent, or Firm* — Saliwanchik, Lloyd & Eisenschenk

(57) ABSTRACT

It is desirable to provide an information processing apparatus, an information processing method, a program, and a monitoring system capable of monitoring a condition of a measured surface highly accurately and using the monitoring result effectively.

To attain the aforementioned object, according to a mode of the present invention, an information processing apparatus includes an obtaining module and a generating module. The obtaining module obtains measuring data about a measured surface. The generating module generates covering material (Continued)

information about a covering material that covers the measured surface based on a feature of the obtained measuring data.

20 Claims, 10 Drawing Sheets

(51) Int. Cl.
| | |
|---|---|
| *G01N 21/84* | (2006.01) |
| *G01N 21/94* | (2006.01) |
| *G01W 1/14* | (2006.01) |
| *G08B 19/02* | (2006.01) |
| *B60W 40/06* | (2012.01) |
| *G01N 21/3554* | (2014.01) |
| *G01N 21/21* | (2006.01) |
| *B60T 8/171* | (2006.01) |
| *B60T 8/172* | (2006.01) |

(52) U.S. Cl.
CPC ............ *G01B 11/06* (2013.01); *G01B 11/065* (2013.01); *G01B 11/0633* (2013.01); *G01N 21/21* (2013.01); *G01N 21/3554* (2013.01); *G01N 21/84* (2013.01); *G01N 21/94* (2013.01); *G01W 1/14* (2013.01); *G08B 19/02* (2013.01); *G01N 2021/945* (2013.01)

(58) Field of Classification Search
CPC ....... G08G 5/025; B60T 8/1703; B60T 8/171; B60T 8/172; B60T 2210/10; B60T 2210/12; B60T 2210/122; B60T 2210/124; B60T 2210/13; B60T 2210/14; B64D 15/20; B64D 45/04; B64D 45/08; G08B 19/02; B60W 40/06; G01W 1/14; G01N 21/47; G01N 21/4738; G01N 21/474; G01N 21/53; G01N 21/538; G01N 21/84; G01N 21/8422; G01N 21/85; G01N 21/88; G01N 21/94; G01N 2021/4733; G01N 2021/4735; G01N 2021/4769; G01N 2021/945; G01N 21/21; G01N 21/25; G01N 21/31; G01N 21/35; G01N 21/3554; G01N 21/3563; G01N 21/3577; G01N 21/3581; G01N 21/359; G01N 9/24; G01N 9/36; G01N 15/00; G01N 15/02; G01N 15/0205; G01N 15/0211; G01N 15/04; G01N 15/06; G01N 15/0606; G01N 15/0612; G01N 15/0618; G01N 15/0625; G01N 15/10; G01N 15/14; G01N 2015/0023; G01N 2015/0026; G01N 2015/003; G01N 2015/0034; G01N 2015/0038; G01N 2015/0042; G01N 2015/0046; G01N 2015/0053; G01N 2015/0092; G01N 2015/0096; G01N 2015/0025; G01N 2015/0277; G01N 2015/0294; G01N 2015/03; G01N 2015/035; G01N 2015/0693; G01N 2015/1087; G01N 2015/1093; G01N 2015/1392; G01N 2015/1495; G01N 2015/1497; G01N 19/02; G01N 19/04; G01N 19/10; G01B 11/06; G01B 11/0608; G01B 11/0616; G01B 11/0625; G01B 11/0633; G01B 11/0641; G01B 11/065; G01B 11/0683; G01B 11/08; G01B 11/22; G01J 5/58; G01J 5/59; G01K 13/02; G01K 13/026; G01K 13/04; G01K 13/06; G01K 13/10; G01K 11/006; G01K 11/12; G01K 11/125; G01K 11/14; G01K 11/18; G01K 11/28
See application file for complete search history.

(56) References Cited

U.S. PATENT DOCUMENTS

| | | | | |
|---|---|---|---|---|
| 5,483,346 A * | 1/1996 | Butzer | ...................... | G01J 4/00 356/239.8 |
| 5,596,320 A * | 1/1997 | Barnes | ................... | B64D 15/20 250/578.1 |
| 5,748,091 A * | 5/1998 | Kim | ....................... | G08B 19/02 340/580 |
| 5,781,115 A * | 7/1998 | Shea | ...................... | B64D 15/20 340/580 |
| 5,962,853 A * | 10/1999 | Huth-Fehre | .............. | G08G 1/04 250/341.8 |
| 6,262,407 B1 | 7/2001 | Teder | | |
| 6,397,161 B1 * | 5/2002 | Tanaka | ................... | B60S 1/0818 702/132 |
| 6,430,996 B1 * | 8/2002 | Anderson | ............ | G01K 13/028 73/170.26 |
| 6,606,035 B2 * | 8/2003 | Kapadia | ................. | G08G 5/0026 340/972 |
| 7,224,453 B2 * | 5/2007 | Elman | .................... | G01J 3/0229 356/326 |
| 7,265,846 B2 * | 9/2007 | Forsyth | ................. | G01N 21/359 250/339.11 |
| 7,586,422 B2 * | 9/2009 | Goodman | ............. | B64C 25/426 340/945 |
| 8,116,989 B2 * | 2/2012 | Journade | ................ | G08G 5/025 701/16 |
| 8,773,289 B2 * | 7/2014 | Maggiore | .............. | G08G 5/065 340/963 |
| 9,299,261 B2 * | 3/2016 | Jones | ..................... | B60T 8/1703 |
| 9,663,223 B1 * | 5/2017 | Harrison | ................. | B64C 19/00 |
| 10,175,167 B2 * | 1/2019 | Grinderslev | ........... | G01B 11/06 |
| 10,202,204 B1 * | 2/2019 | Daidzic | .................... | B64C 5/02 |
| 10,358,233 B1 * | 7/2019 | Tiana | ................. | G02B 27/0101 |
| 10,365,206 B2 * | 7/2019 | Kanda | ...................... | G01V 8/12 |
| 10,576,948 B2 * | 3/2020 | Sharma | ................. | B60T 8/1703 |
| 10,900,893 B2 * | 1/2021 | Hatanaka | ............... | G01B 11/06 |
| 2004/0036630 A1 * | 2/2004 | Jamieson | ................ | G01N 21/21 340/962 |
| 2009/0125169 A1 * | 5/2009 | Edwards | ................ | G08G 5/025 701/19 |
| 2010/0039294 A1 * | 2/2010 | Feyereisen | ............ | G08G 5/025 340/972 |
| 2016/0140854 A1 * | 5/2016 | Enns | .................... | G08G 5/0008 701/16 |
| 2016/0196754 A1 * | 7/2016 | Surace | ................ | G08G 5/0082 701/117 |
| 2017/0061806 A1 * | 3/2017 | Daveau | ................. | G08G 5/0091 |
| 2017/0124402 A1 | 5/2017 | Tanaka et al. | | |
| 2019/0017933 A1 * | 1/2019 | Adler | .................... | G01N 21/94 |

FOREIGN PATENT DOCUMENTS

| | | | |
|---|---|---|---|
| JP | 2000258557 A | * | 9/2000 |
| JP | 2003-502619 A | | 1/2003 |
| JP | 2004-170432 A | | 6/2004 |
| JP | 2008-180623 A | | 8/2008 |
| JP | 2014-52364 A | | 3/2014 |
| JP | 2015-1379 A | | 1/2015 |
| JP | 2016-170069 A | | 9/2016 |
| JP | 2016170069 A | * | 9/2016 |
| JP | 2017-83352 A | | 5/2017 |

OTHER PUBLICATIONS

Office Action dated Sep. 6, 2021 in Japanese Application No. 2017-208077.
International Search Report in International Application No. PCT/JP2018/031949, filed Aug. 29, 2018.

(56) References Cited

OTHER PUBLICATIONS

"Aerodromes," *International Standards and Recommended Practices*, Jul. 2016, 1(7):1-11, International Civil Aviation Organization.
Itoh, F., "The Next Generation Aeronautical Innovation Hub Center," *JAXA Aeronautics Magazine Flight Path*, Dec. 2015, 11:3-7.

* cited by examiner

| Date and time | AI identification result | | Correct value (real measured value) | |
|---|---|---|---|---|
| 20170215135544 | Granular snow | 22mm | Granular snow | 20mm |
| 20170215135950 | Granular snow | 40mm | Granular snow | 60mm |
| 20170215140305 | Compacted snow | 67mm | Fresh snow | 30mm |
| 20170215140543 | Compacted snow | 70mm | Compacted snow | 28mm |
| 20170215140917 | Granular snow | 0mm | Granular snow | 20mm |
| 20170215143646 | Compacted snow | 49mm | Fresh snow | 40mm |
| 20170215144052 | Fresh snow | 24mm | Fresh snow | 15mm |
| 20170215144520 | Fresh snow | 68mm | Fresh snow | 70mm |
| 20170215144909 | Granular snow | 31mm | Granular snow | 20mm |
| 20170215145411 | Granular snow | 13mm | Granular snow | 25mm |
| 20170215145736 | Granular snow | 47mm | Granular snow | 55mm |

FIG.10

INFORMATION PROCESSING APPARATUS, INFORMATION PROCESSING METHOD, PROGRAM, AND MONITORING SYSTEM

CROSS-REFERENCE TO RELATED APPLICATIONS

This application is the U.S. national stage application of International Patent Application No. PCT/JP2018/031949, filed Aug. 29, 2018, which claims the benefit under 35 U.S.C. § 119 of Japanese Application No. 2017-208077, filed Oct. 27, 2017, the disclosures of each of which are incorporated herein by reference in their entirety.

TECHNICAL FIELD

The present invention relates to an information processing apparatus, an information processing method, a program, and a monitoring system applicable to surface condition monitoring of a road or a structure.

BACKGROUND ART

It is important to monitor snow accretion/ice accretion conditions of road surfaces and runway surfaces (hereinafter, referred to as "road surfaces") in terms of safety management. There is known a monitoring technology of irradiating a road surface with a laser, a sound wave, or the like from the outside and measuring the distance to thereby measure the depth of a snow cover. Further, a technology of measuring a condition of a snow cover and the like by emitting an external electromagnetic wave is known.

However, if a monitoring apparatus is arranged on a road surface or near the road surface to execute the aforementioned technology, then it may highly likely to be a traffic obstacle. Further, due to an influence on safeties of takeoff and landing of aircrafts regarding airport runways, there is a large restriction in setting the monitoring apparatus itself above the runway or a periphery thereof.

Patent Literature 1 discloses a snow and ice monitoring apparatus which is capable of being buried below a road surface or inside a structure, determining snow and the like (snow, ice, water, volcanic ash, sands, or the like) locally covering the road surface or the structure surface, and monitoring the condition of the depth and/or the quality of a snow cover in detail.

If the snow and ice monitoring apparatus is buried below the runway, without becoming an obstacle for aircrafts, it is possible to monitor a specific condition of a snow cover regarding a depth and quality of the entire runway while inhibiting a breakage or the like due to collisions of external foreign materials and the like (paragraphs?[0011] and [0016] of specification of Patent Literature 1).

CITATION LIST

Patent Literature

Patent Literature 1: Japanese Patent Application Laid-open No. 2016-170069

DISCLOSURE OF INVENTION

Technical Problem

As described above, it is very important to monitor the condition of the road surface and the structure surface highly accurately. It is desirable to provide a technology for using the monitoring result effectively.

In view of the aforementioned circumstances, it is an object of the present invention to provide an information processing apparatus, an information processing method, a program, and a monitoring system capable of monitoring a condition of a measured surface highly accurately and using the monitoring result effectively.

Solution to Problem

To attain the aforementioned object, according to a mode of the present invention, an information processing apparatus includes an obtaining module and a generating module.

The obtaining module obtains measuring data about a measured surface.

The generating module generates covering material information about a covering material that covers the measured surface based on a feature of the obtained measuring data.

The information processing apparatus generates covering material information based on the feature of the measuring data of the measured surface. Therefore it is possible to monitor the condition of the measured surface highly accurately, and use the monitoring result effectively.

The covering material information may include at least one of a type, a thickness, a density, a particle diameter, a moisture content, a temperature, a cover distribution, a friction coefficient, slipperiness index information, and an evaluation value based on a predetermined criterion of the covering material.

As a result, it is possible to execute monitoring highly accurately and use the monitoring result effectively.

The evaluation value based on the predetermined criterion may include a runway condition code defined by International Civil Aviation Organization.

As a result, it is possible to manage a runway based on the runway condition code easily.

The generating module may generate predictive information indicating a predictive condition of the measured surface based on at least one of the obtained measuring data and the generated covering material information.

As a result, it is possible to execute monitoring highly accurately and use the monitoring result effectively.

The obtaining module may generate predictive measuring data about the measured surface based on a feature of the obtained measuring data. In this case, the generating module may generate the predictive information based on the generated predictive measuring data.

As a result, it is possible to execute monitoring highly accurately and use the monitoring result effectively.

The information processing apparatus may further include an output module that outputs output data including the generated covering material information.

As a result, a user may know the condition of the measured surface easily, and determine the management guidance and the like easily.

The output data may include at least one of text data, image data, and sound data including the covering material information.

As a result, a user may know the condition of the measured surface easily, and determine the management guidance and the like easily.

The covering material that covers the measured surface may include snow that covers a runway surface.

As a result, it is possible to monitor the condition of the runway surface highly accurately and use the monitoring result effectively. Note that, in the present disclosure, each of ice and water is one snow type (one snow condition). In short, "snow" includes "snow and ice".

The output module may output the output data, the output data including at least one of a thickness, a type, a density, a particle diameter, a moisture content, a temperature, a cover distribution, a friction coefficient, and slipperiness information of the snow that covers the runway surface, a runway condition code defined by International Civil Aviation Organization, necessity/unnecessity of snow removal, and takeoff and landing availability/unavailability information.

As a result, a user may know the condition of the runway surface easily, and determine the management guidance and the like easily.

The generating module may generate the covering material information based on a predetermined machine learning algorithm. As a matter of course, predetermined deep learning algorithm, predetermined AI (artificial intelligence) algorithm may be used.

As a result, it is possible to monitor the condition of the measured surface highly accurately and use the monitoring result effectively.

The measuring data may include measuring text data or measuring image data obtained by irradiating the measured surface with a measuring wave.

As a result, it is possible to monitor the condition of the measured surface highly accurately and use the monitoring result effectively.

The measuring data may include measuring text data or measuring image data obtained by irradiating the measured surface with at least one of an electromagnetic wave having a predetermined wavelength, an electromagnetic wave having a predetermined wavelength band, and an electromagnetic wave having a predetermined wavelength width.

As a result, it is possible to monitor the condition of the measured surface highly accurately and use the monitoring result effectively.

The measuring data may include a plurality of measuring data corresponding to a plurality of electromagnetic waves having different wavelengths obtained by irradiating the measured surface with the plurality of electromagnetic waves having different wavelengths. In this case, the generating module may generate the covering material information based on the plurality of measuring data.

As a result, it is possible to monitor the condition of the measured surface highly accurately and use the monitoring result effectively.

The measuring data may include a plurality of measuring data corresponding to a plurality of electromagnetic waves having different wavelength bands or wavelength widths obtained by irradiating the measured surface with the plurality of electromagnetic waves having different wavelength bands or wavelength widths. In this case, the generating module may generate the covering material information based on the plurality of measuring data.

As a result, it is possible to monitor the condition of the measured surface highly accurately and use the monitoring result effectively.

The generating module may generate a plurality of covering material information of different types corresponding to the plurality of measuring data.

As a result, it is possible to monitor the condition of the measured surface highly accurately and use the monitoring result effectively.

The plurality of covering material information of the different types may include a thickness, a moisture content, and a particle diameter of the covering material.

As a result, it is possible to monitor the condition of the measured surface highly accurately and use the monitoring result effectively.

The information processing apparatus may further include a setting module that sets a property of the measuring wave based on at least one of the obtained measuring data and the generated covering material information.

As a result, it is possible to monitor the condition of the measured surface highly accurately and use the monitoring result effectively.

The information processing apparatus may further include a control information generating module that generates control information for controlling an external apparatus based on at least one of the obtained measuring data and the generated covering material information.

According to a mode of the present invention, there is provided an information processing method executable by a computer system, including:

obtaining measuring data about a measured surface; and generating covering material information about a covering material that covers the measured surface based on a feature of the obtained measuring data.

According to a mode of the present invention, there is provided a program executable by a computer system, the program causing the computer system to execute:

the step of obtaining measuring data about a measured surface; and the step of generating covering material information about a covering material that covers the measured surface based on a feature of the obtained measuring data.

According to a mode of the present invention, a monitoring system includes a monitoring apparatus and an information processing apparatus.

The monitoring apparatus irradiates a measured surface with a measuring wave and generates measuring data about the measured surface.

The information processing apparatus includes a generating module and an output module.

The generating module generates covering material information about a covering material that covers the measured surface based on a feature of the generated measuring data.

The output module outputs output data including the generated covering material information.

Advantageous Effects of Invention

As described above, according to the present invention, it is possible to monitor a condition of a measured surface highly accurately and use the monitoring result effectively.

BRIEF DESCRIPTION OF DRAWINGS

FIG. 10 A table showing identification results with respect to real snow covers.

MODE(S) FOR CARRYING OUT THE INVENTION

Hereinafter, embodiments of the present invention will be described with reference to the drawings.

First Embodiment

[Snow and Ice Monitoring System]

Figure 1:
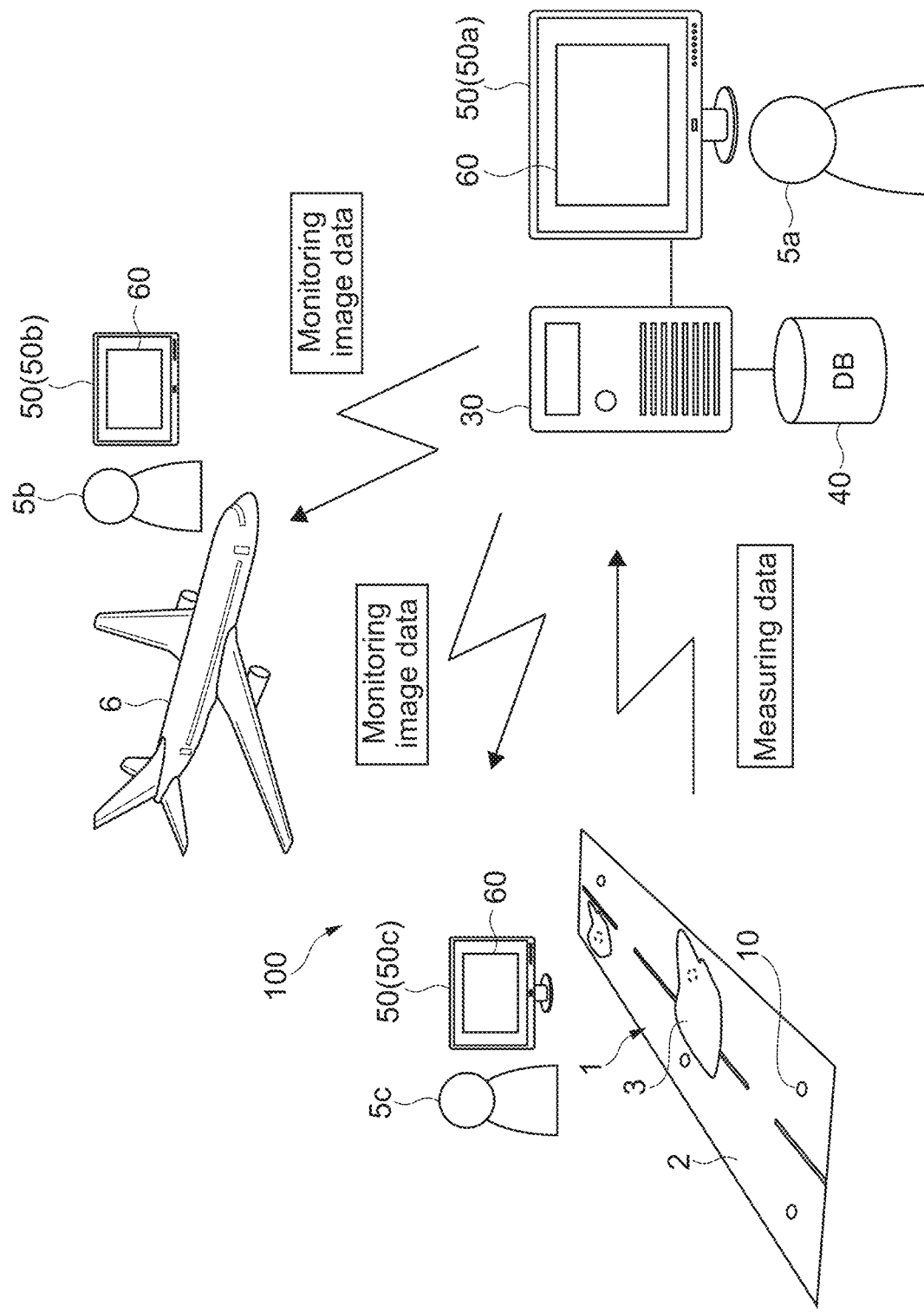
FIG. 1 A diagram schematically showing a configuration example of a snow and ice monitoring system of a first embodiment.

FIG. 1 schematically shows a configuration example of a snow and ice monitoring system of a first embodiment of the present invention. The snow and ice monitoring system 100 includes the monitoring apparatus 10, the analyzer apparatus 30, the database 40, and the display 50.

The monitoring apparatus 10 is buried below (underground) the runway 1 of an airport. The monitoring apparatus 10 monitors the condition of the surface 2 of the runway 1, and sends measuring data about the surface 2 of the runway 1 to the analyzer apparatus 30 as the monitoring result. In the present embodiment, the surface of the runway 1 corresponds to a measured surface.

A communication mode for sending measuring data is not limited. For example, measuring data is sent via a network such as a WAN (Wide Area Network) or a LAN (Local Area Network). Alternatively, measuring data may be sent via wireless communication using high frequency signals or the like. Other arbitrary communication modes that employ wireless or wired communication may be constructed alternatively.

The analyzer apparatus 30 receives measuring data sent from the monitoring apparatus 10. The analyzer apparatus 30 generates snow and ice information about the snow (snow and ice) 3 that covers the surface 2 of the runway 1 based on the feature of measuring data.

Note that, in the description of the present disclosure, each of ice and water is one type of snow (one snow condition). For example, the snow thickness also means the thickness of ice that covers the surface 2 of the runway 1. Further, the wet condition of the surface 2 of the runway 1 is recognized as a condition in which water (one type of snow) covers the surface 2 of the runway 1.

In the present embodiment, the snow 3 corresponds to a covering material that covers a measured surface. Further, the snow and ice information corresponds to covering material information about the covering material that covers the measured surface.

The snow and ice information includes, for example, the type, a thickness (covering amount), a density, a moisture content, a temperature, a cover distribution, and the like of the snow 3. Further, as the snow and ice information, an estimated value of a friction coefficient of the surface 2 of the runway 1 covered with the snow 3 and an evaluation value obtained by evaluating the condition of the runway 1 covered with the snow 3 in accordance with a predetermined criterion are generated. Examples of such an evaluation value include the runway condition code (RWYCC) defined by International Civil Aviation Organization (ICAO). The evaluation value in accordance with a predetermined criterion may be a conversion amount converted into a value in accordance with the predetermined criterion. Note that, as a predetermined criterion, another evaluation criterion, another index, or the like may be used.

The kind of information generated as snow and ice information about the snow 3 is not limited. Arbitrary information about the snow 3 may be generated such as an arbitrary physical amount about the covering snow 3, the condition of the surface 2 of the runway 1 covered with the snow 3, or the outside temperature at the timing when the snow 3 started covering the surface 2. Further, arbitrary information about slipperiness such as arbitrary information being a slipperiness index may be generated as covering material information.

As a result, it is possible to monitor the condition of the surface 2 of the runway 1 highly accurately, and use the monitoring result effectively. Note that the monitoring result includes both the information obtained based on the snow and ice information and the snow and ice information itself.

The analyzer apparatus 30 is capable of generating and outputting at least one of text data, image data, and sound data as output data including the snow and ice information. For example, the monitoring image 60 including the snow and ice information is generated and output to the display 50. For example, the manager 5*a* in an airport control room or the like watches the monitoring image 60 displayed on the display 50*a*, and is thereby capable of determining a management guidance or the like of the runway 1.

Further, the analyzer apparatus 30 sends the image data of the monitoring image 60 to the aircraft 6 wirelessly, for example. As a result, the pilot 5*b* watches the monitoring image 60 displayed on the display 50*b* in a cockpit, and is thereby capable of determining availability/unavailability of takeoff and landing at the runway 1. Further, the image data of the monitoring image 60 may be sent to the display 50*c* that the dispatcher 5*c* can watch. As a result, the dispatcher 5*c* watches the monitoring image 60, and is thereby capable of determining availability/unavailability of takeoff and landing at the runway 1.

As a matter of course, the analyzer apparatus 30 may generate sound data including the snow and ice information. Sounds including the snow and ice information are output via speakers in a control room, a cockpit, a ground manager room, and the like. As a result, the manager 5*a*, the pilot 5*b*, and the dispatcher 5*c* are capable of selecting a measure appropriately depending on the condition of the surface 2 of the runway 1.

Further, text data including value data of the snow and ice information may be generated and output to the display 50. For example, in a state where a predetermined image is displayed on the displays 50*a*, 50*b*, and 50*c*, text data including the snow and ice information is displayed on the top or the bottom of the screen, for example. As a result, the manager 5*a*, the pilot 5*b*, and the dispatcher 5*c* may know the condition of the surface 2 of the runway 1 easily, and select a measure appropriately.

The database 40 stores histories of measuring data sent from the monitoring apparatus 10, snow and ice information generated by the analyzer apparatus 30, and the like. Various other data that the snow and ice monitoring system 100 uses is stored.

[Monitoring Apparatus]

Figure 2:
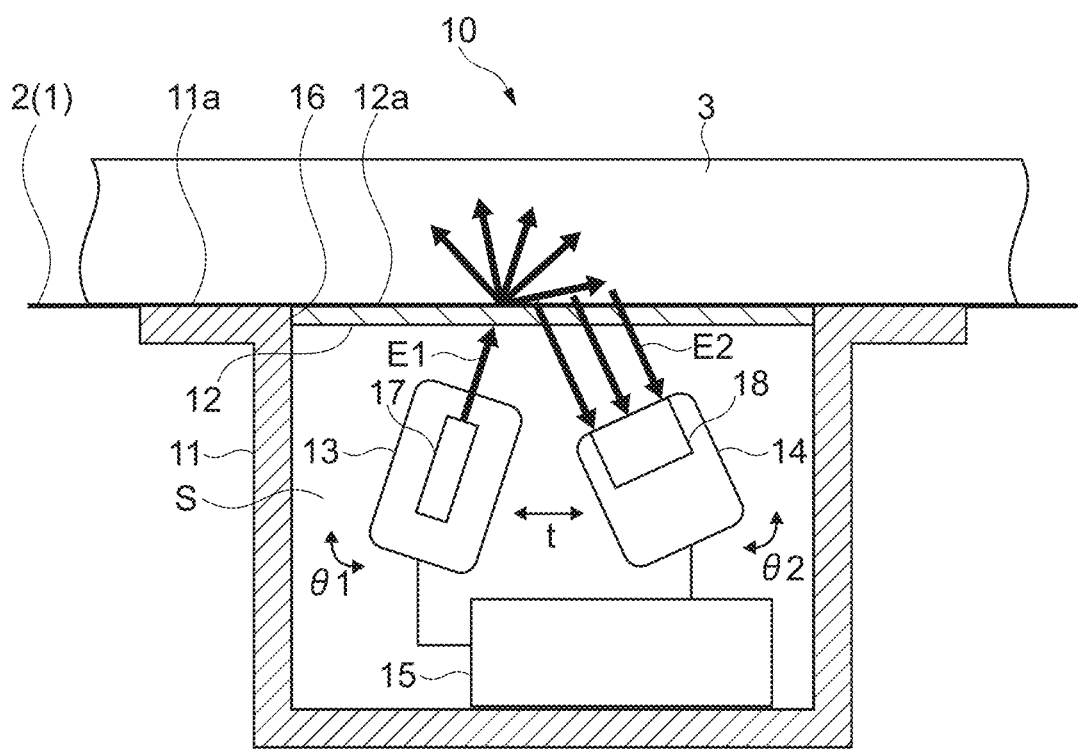
FIG. 2 A diagram schematically showing a configuration example of a monitoring apparatus.

FIG. 2 schematically shows a configuration example of the monitoring apparatus 10. The monitoring apparatus 10 includes the case unit 11, the transparent member 12, the transmission unit 13, the reception unit 14, and the control block 15.

The case unit 11 includes the interior space S, and is and buried below the runway 1 such that the top surface 11a of the case unit 11 is approximately flush with the surface 2 of the runway 1. Further, the top surface 11a of the case unit 11 has the opening 16. The shape (shape of the interior space S) of the case unit 11 and the shape of the opening 16 are not limited. For example, the case unit 11 having a cylindrical shape and including the opening 16 having a circular shape may be used. Alternatively, the case unit 11 having a rectangular parallelepiped shape and including the opening 16 having a rectangular shape may be used.

The transparent member 12 is a member having transparency, and fitted into the opening 16 of the top surface 11a of the case unit 11 without a gap. The transparent member 12 is provided at the opening 16 of the case unit 11 such that the surface 12a of the transparent member 12 is flush with the surface 2 of the runway 1 being a measured surface. As a result, measuring data about the surface 2 of the runway 1 may be obtained. Note that the surface 12a of the transparent member 12 is included in the measured surface. Note that the surface 12a is not necessarily be flush with the surface 2 of the runway 1, and their heights may be different.

The specific material of the transparent member 12 is not limited, and a member having a predetermined toughness such as toughened glass or toughened plastic may be used as necessary. Further, to have transparency means both the transparent condition and translucent condition with respect to the electromagnetic wave E1. To have transparency does not necessarily mean the transparent condition and translucent condition with respect to visible light.

The transmission unit 13 is provided at a predetermined location in the interior space S of the case unit 11, and includes the transmitter 17 that emits the electromagnetic wave E1 being a measuring wave. In the present embodiment, the transmission unit 13 is capable of emitting the plurality of electromagnetic waves E1 having different wavelengths.

The transmitter 17 is, for example, a laser oscillator, and may be capable of transmitting laser light having a plurality of different wavelengths by itself. Alternatively, a plurality of transmitters 17 capable of transmitting laser light having a plurality of different wavelengths may be attached to the transmission unit 13. The wavelength band and wavelength width of the laser light is not limited. A wide band laser light, a narrow band laser light, or the like may be used as a measuring wave (the electromagnetic wave E1) as necessary.

The structure of the transmission unit 13 and the type of the electromagnetic wave E1 emitted as the measuring wave are not limited. For example, the transmission unit 13 including another light source such as an LED or a lamp light source as the transmitter 17 may be used. Further, the transmission unit 13 may have optical filters and the like capable of controlling the wavelength band, the wavelength width, the polarization direction, and the like of the electromagnetic wave E1 emitted toward the transparent member 12. Note that the "electromagnetic wave" includes light having arbitrary wavelength bands such as infrared light, visible light, or ultraviolet light.

As shown in FIG. 2, the transmission unit 13 is arranged such that the transmission unit 13 is inclined by a predetermined angle with respect to the bottom surface of the transparent member 12. In other words, the transmission unit 13 has a structure with which the incident angle of the electromagnetic wave E1, which enters the bottom surface of the transparent member 12, has an inclination. FIG. 2 schematically shows the arrangement angle Θ1 of the transmission unit 13 with an arc arrow.

The specific value of the arrangement angle Θ1 is not limited. For example, where the angle (angle of the electromagnetic wave E1 that enters orthogonally) of the transmission unit 13 that faces orthogonally to the bottom surface of the transparent member 12 is 0°, the arrangement angle Θ1 with respect to the reception unit 14 is set between 0° and 90°.

The reception unit 14 is provided at a location in the interior space S of the case unit 11, and faces the transmission unit 13. The reception unit 14 is distant from the transmission unit 13 at a predetermined distance t. The reception unit 14 includes the receiver 18 capable of detecting the intensity distribution of the electromagnetic waves E2 emitted from the bottom surface of the transparent member 12.

As schematically shown in FIG. 2, the electromagnetic wave E1 is transmitted from the transmission unit 13, and reflected and scattered by the snow 3 that covers the surface 12a of the transparent member 12. The scattered wave (scattered light), which is reflected and scattered by the snow 3, is emitted from the bottom surface of the transparent member 12. Hereinafter, the electromagnetic wave E2 emitted from the bottom surface of the transparent member 12 may be referred to as scattered wave E2 denoted by the same reference symbol.

The receiver 18 is, for example, a two-dimensional optical sensor such as a CCD or a CMOS camera, and may be capable of detecting a two-dimensional intensity distribution of the plurality of scattered waves E2 having different wavelengths by itself. Alternatively, a plurality of receivers 18 may be attached to the reception unit 14 so that a one-dimensional or two-dimensional intensity distribution of the plurality of scattered waves E2 having different wavelengths is detected as a whole.

The structure of the reception unit 14 is not limited, and the reception unit 14 may have an arbitrary structure. For example, the reception unit 14 may have optical filters and the like having wavelength selection properties for allowing transmission of only the electromagnetic wave E2 to be detected.

As shown in FIG. 2, the reception unit 14 is arranged such that the reception unit 14 is inclined by a predetermined angle with respect to the bottom surface of the transparent member 12. FIG. 2 schematically shows the arrangement angle Θ2 of the reception unit 14 with an arc arrow.

The specific value of the distance t between the transmission unit 13 and the reception unit 14 and the arrangement angle Θ2 are not limited. For example, where the angle of the reception unit 14 that faces orthogonally to the bottom surface of the transparent member 12 is 0°, the arrangement angle Θ2 with respect to the transmission unit 13 is set between 0° and 90°.

Further, for example, a drive mechanism (not shown) may be capable of arbitrarily controlling the location and attitude of the transmission unit 13, the location and attitude of the reception unit 14, and the like. For example, the arrangement angle Θ1 of the transmission unit 13 (in other words, incident angle of the electromagnetic waves E1 entering the transparent member 12) may be arbitrarily controlled. Further, the distance t between the transmission unit 13 and the reception unit 14, and the arrangement angle Θ2 of the reception unit 14 may be arbitrarily controlled. As a result, measuring data with a high degree of accuracy may be obtained.

A drive mechanism may be, for example, realized by an arbitrary actuator mechanism including motors, gear mechanisms, and the like. As a matter of course, another arbitrary structure may be used. As a matter of course, a structure capable of manually changing the arrangement angle Θ1 of the transmission unit 13, the distance t between the transmission unit 13 and the reception unit 14, and the arrangement angle Θ2 of the reception unit 14 may be used.

The control block 15 includes a power source unit, a control unit, a communication unit, and the like (not shown). The power source unit supplies power to the transmission unit 13 and the reception unit 14. A specific structure of the power source unit is not limited.

The control unit controls the respective operations of the transmission unit 13 and the reception unit 14 to transmit the electromagnetic wave E1 having a predetermined wavelength, detect the intensity of the two-dimensional distribution of the scattered waves E2 having a predetermined wavelength, and the like. In the present embodiment, the control unit sends measuring data including an intensity signal (measure signal) obtained by the receiver 18 of the reception unit 14 to the analyzer apparatus 30 of FIG. 1 via the communication unit.

The control unit has a hardware configuration necessary for a computer such as, for example, a CPU or memories (RAM and ROM). As the control unit, for example, a device such as a PLD (Programmable Logic Device) such as an FPGA (Field Programmable Gate Array) or another ASIC (Application Specific Integrated Circuit) may be used. As the communication unit, for example, an arbitrary configuration such as an arbitrary wireless module may be used.

Figure 3:
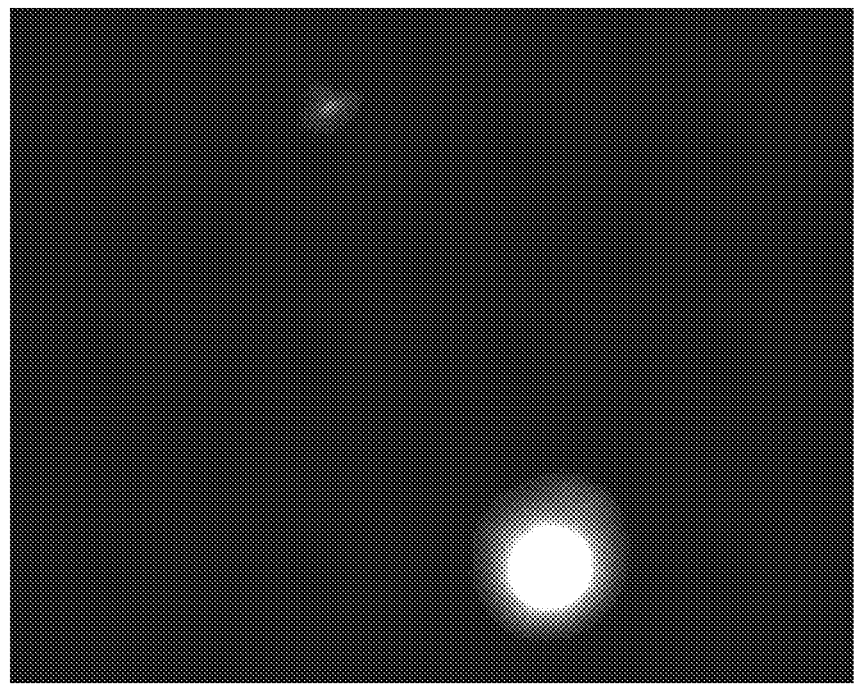
FIG. 3 A photograph showing an example of measuring data sent from the monitoring apparatus.
Figure 4:
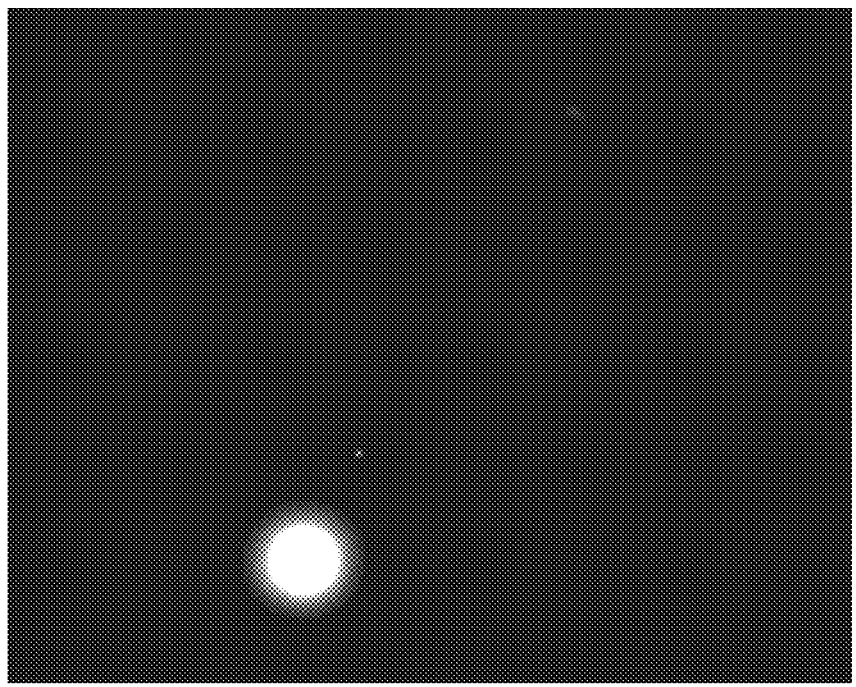
FIG. 4 A photograph showing an example of measuring data sent from the monitoring apparatus.
Figure 5:
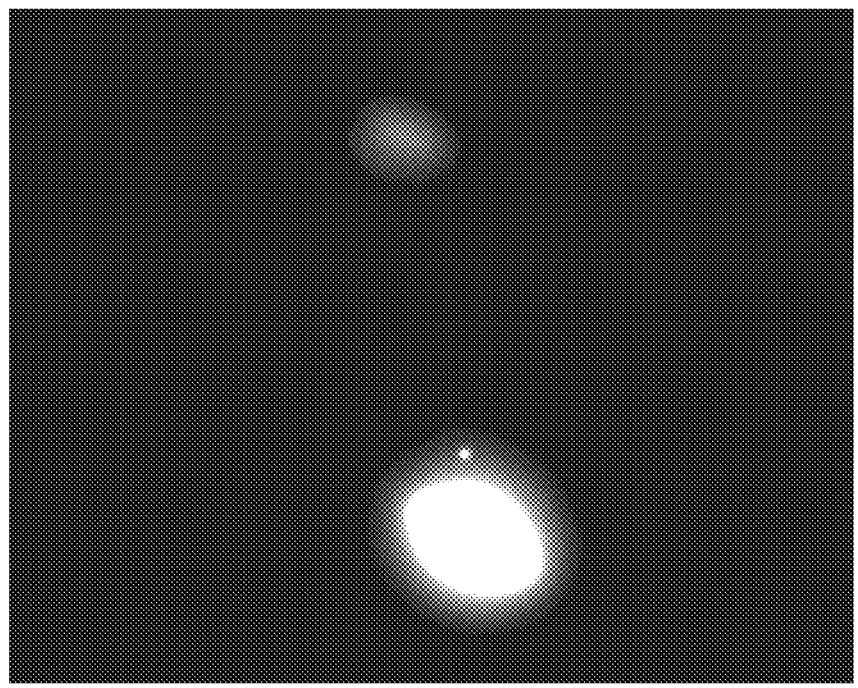
FIG. 5 A photograph showing an example of measuring data sent from the monitoring apparatus.

FIG. 3 to FIG. 5 are photographs showing examples of measuring data sent from the monitoring apparatus 10 to the analyzer apparatus 30. In the present embodiment, the two-dimensional intensity distributions of the scattered waves E2 having different wavelengths are sent as measuring data. Specifically, an image signal including intensity information (brightness information) of the respective pixels generated by the receiver 18 is sent as measuring data.

In the present embodiment, the image signal generated by the receiver 18 corresponds to measuring image data obtained by irradiating the measured surface with a measuring wave. Hereinafter, the image signal will be referred to as measuring image data.

FIG. 3 to FIG. 5 show images generated based on measuring image data obtained when the transparent member 12 covered with the snow 3 is irradiated with the electromagnetic waves E1 having different wavelengths. Hereinafter, the image itself will sometimes be referred to as measuring image data.

The electromagnetic wave E1 is emitted toward the transparent member 12, reflected and scattered by the snow 3, and emitted from the transparent member 12 toward the reception unit 14 as the scattered waves E2. The image signal of the scattered waves E2 reflected and scattered by the snow 3 is generated as the measuring image data.

For example, the electromagnetic waves E1 having the first to third different wavelengths λ1 to λ3 are emitted, and the three types of images (image signals) of FIG. 3 to FIG. 5 are thereby generated. Those images are two-dimensional light scattering images of the scattered waves E2 obtained by emitting the electromagnetic waves E1. In other words, those images are two-dimensional light scattering images of the scattered waves E2 having the first to third wavelengths λ1 to λ3. The three types of two-dimensional light scattering images (image signals) are sent to the analyzer apparatus 30 as measuring image data.

In the present embodiment, the three types of measuring image data correspond to a plurality of measuring data corresponding to a plurality of electromagnetic waves having different wavelengths obtained by irradiating the measured surface with the plurality of electromagnetic waves having different wavelengths. As a matter of course, the plurality of measuring data is not limited to the three types of measuring image data, and an arbitrary number (two or more) of measuring image data may be generated. As a matter of course, an electromagnetic wave of one wavelength type may be emitted, only one type of measuring image data may be thereby generated and sent to the analyzer apparatus 30 to thereby generate snow and ice information.

Figure 6:
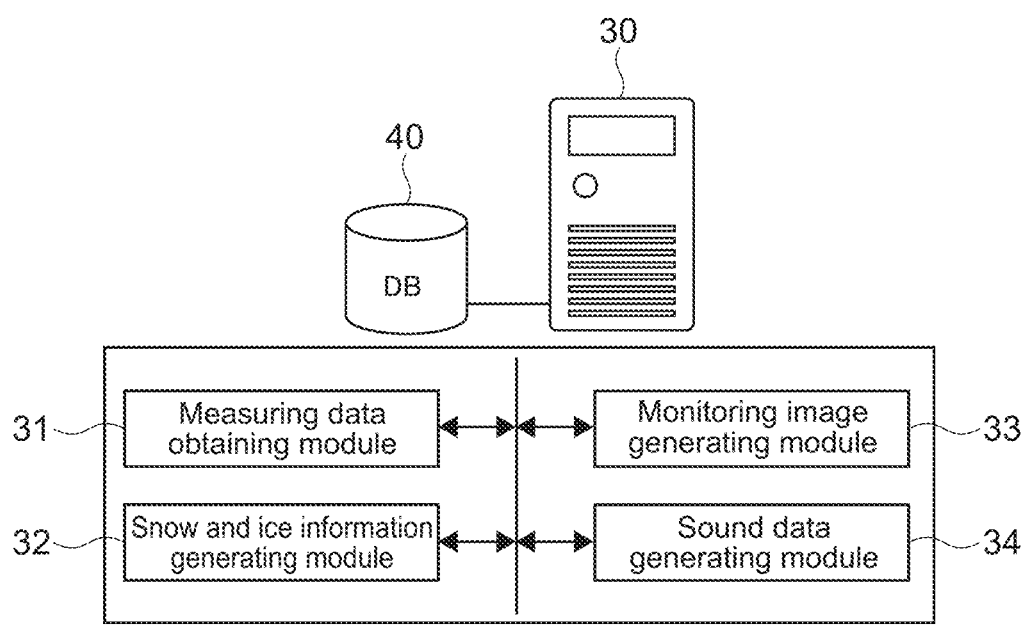
FIG. 6 A block diagram showing a functional configuration example of an analyzer apparatus.

FIG. 6 is a block diagram showing a functional configuration example of the analyzer apparatus 30. The analyzer apparatus 30 includes hardware necessary for a computer configuration such as a CPU, a ROM, a RAM, or an HDD. As the analyzer apparatus 30, for example, a PC (Personal Computer) is used, but another arbitrary computer may be used alternatively.

The CPU loads a program of the present technology stored in the ROM or the HDD in the RAM and executes the program to thereby realize the measuring data obtaining module 31, the snow and ice information generating module 32, the monitoring image generating module 33, and the sound data generating module 34, which are functional blocks of FIG. 6. Further, those functional blocks execute an information processing method of the present technology. Note that dedicated hardware may be used as necessary to realize the respective functional blocks. In the present embodiment, the analyzer apparatus 30 corresponds to an information processing apparatus.

The program is installed in the analyzer apparatus 30 via, for example, various recording media. Alternatively, the program may be installed via the Internet or the like.

[Snow and Ice Monitoring Operation]

Figure 7:
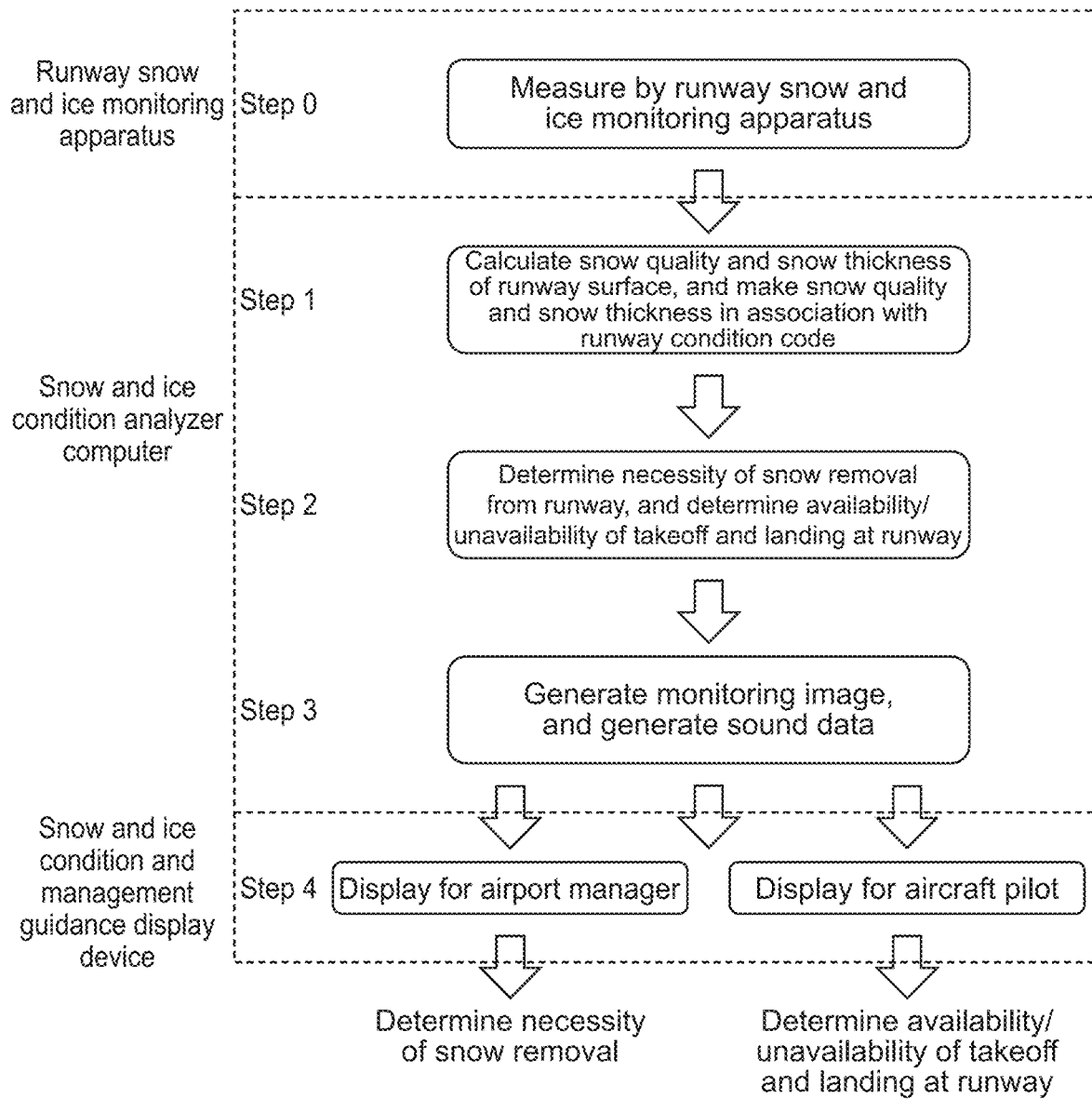
FIG. 7 A flowchart showing an example of a snow and ice monitoring operation.

FIG. 7 is a flowchart showing an example of a snow and ice monitoring operation. In FIG. 7, the "runway snow and ice monitoring apparatus" corresponds to the monitoring apparatus 10, and the "snow and ice condition analyzer computer" corresponds to the analyzer apparatus 30. Further, in FIG. 7, the "snow and ice condition and management guidance display device" corresponds to the display 50 of FIG. 1.

In the present embodiment, in Step 0, firstly, the monitoring apparatus 10 executes measuring. Specifically, measuring image data of the snow 3 that covers the surface 12*a* of the transparent member 12 is generated. In the present embodiment, as shown in the examples of FIG. 3 to FIG. 5, the electromagnetic waves E1 of the first to third wavelengths λ1 to λ3 are emitted, and the three types of measuring image data are thereby obtained, generated, and sent to the analyzer apparatus 30. The measuring data obtaining module 31 of FIG. 6 obtains the sent measuring image data. In the present embodiment, the measuring data obtaining module 31 functions as an obtaining module.

Next, in Step 1, the analyzer apparatus 30 generates snow and ice information about snow (snow that covers the surface 2 of the runway 1) that covers the transparent member 12 based on the feature of the measuring image data. As shown in FIG. 7, in the present embodiment, the snow and ice information generating module 32 of FIG. 6 firstly calculates the type (snow quality) of the snow 3 and the thickness (snow thickness) of the snow 3.

Examples of the snow quality includes arbitrary snow conditions such as "frost", "dry snow", "slush", "wet snow", "compacted snow", "ice", "fresh snow", or "granular snow". Further, as snow and ice information about snow, "dry" information that means a snowless condition, and information such as "wet" or "standing water" may be generated. Such information may be handled similar to the snow quality information.

As the snow thickness, for example, information (mm) is generated. As a matter of course, snow thickness information may be generated in a unit of arbitrary thickness such as 5 mm, 10 mm, or 50 mm.

A method of calculating the snow quality and snow thickness based on features of measuring image data shown in FIG. 3 to FIG. 5 as examples will be described.

Figure 8:
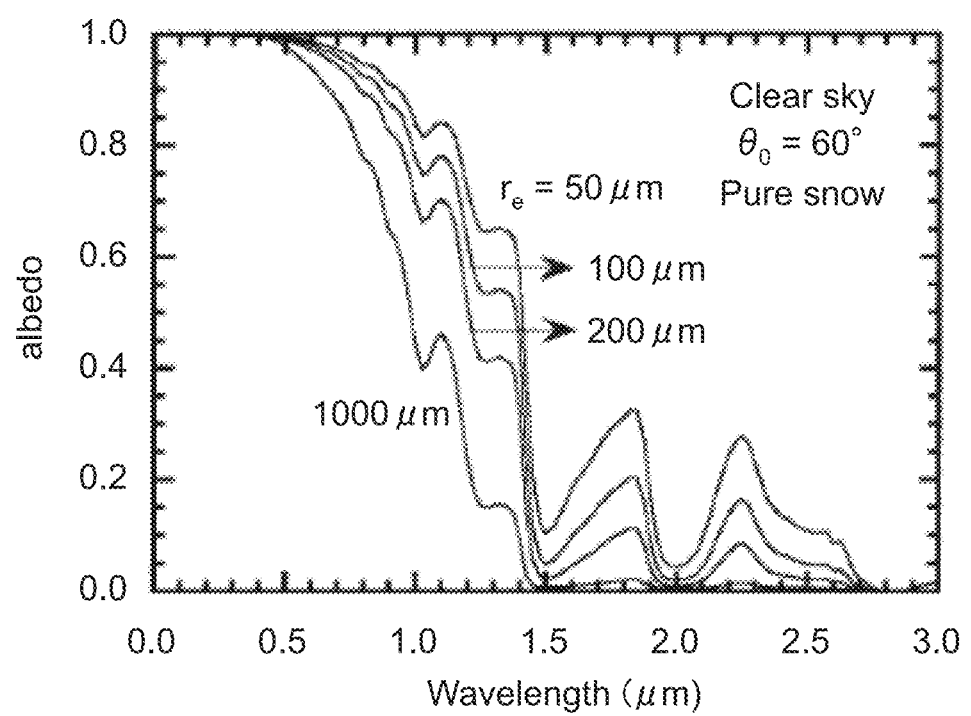
FIG. 8 A graph showing an example of a snow cover radiative transfer model.

FIG. 8 is a graph showing an example of a snow cover radiative transfer model. Based on the snow cover radiative transfer model, an albedo (ratio of reflected light to incident light) varies depending on the wavelength (re=50 μm in figure corresponds to fresh snow, and 100 μm corresponds to granular snow). Accordingly, an amount of reflected/scattered light largely differs with respect to a snow quality and wavelength, and a snow thickness and snow quality can be calculated from a reflection/scattering intensity relationship with respect to the wavelength of light.

Then, by emitting the plurality of electromagnetic waves E1 having different wavelengths and by detecting a two-dimensional intensity distribution of the scattered waves E2 of the different wavelengths, the quality and thickness of the snow (including ice and water) 3 on the transparent member 12 can be obtained separately and highly accurately. As a result, it is possible to monitor the condition of the snow 3 in detail.

Figure 9:
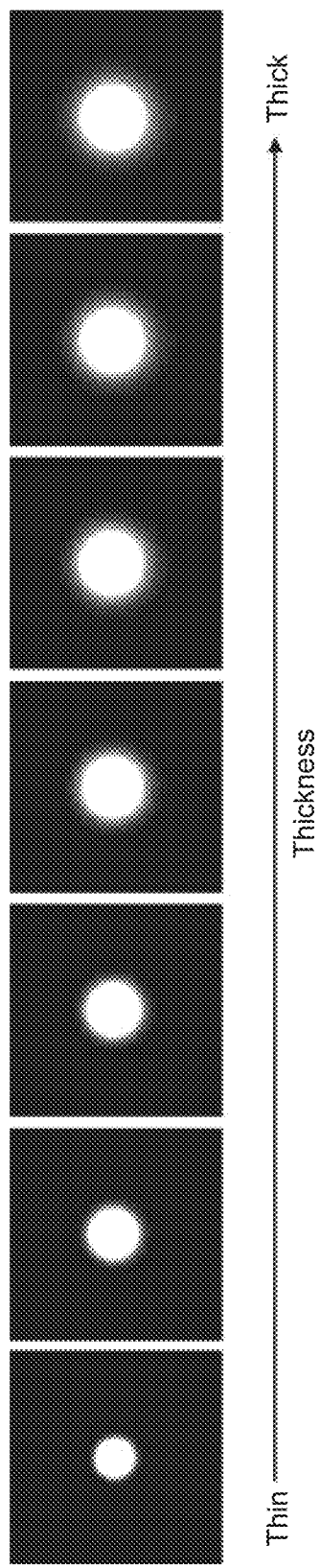
FIG. 9 Photographs showing measuring image data where snow having different thickness is irradiated with an electromagnetic wave having the same wavelength.

FIG. 9 shows photographs showing measuring image data when the snow 3 having different thickness is irradiated with the electromagnetic wave E1 having the same wavelength. The larger (thicker) the snow thickness, the larger the amount of the scattered waves E2 reflected and scattered by the snow 3. So the amount of the scattered waves E2 emitted from the transparent member 12 to the reception unit 14 is larger, and the maximum diameter (maximum diameter of light receiving region) of the scattered waves E2 included in the measuring image data is larger. In other words, the maximum diameter of the scattered waves E2 varies depending on the snow thickness. So it is possible to monitor the snow thickness highly accurately based on the feature of measuring image data.

Further, the amount of the scattered waves E2 reflected and scattered by the snow 3 varies depending on variance of the moisture content (water content) and the particle diameter of the snow 3 that covers the transparent member 12. Therefore it is possible to monitor not only the snow thickness but also the moisture content and the particle diameter highly accurately based on the feature of measuring image data. It is possible to identify the snow quality such as "dry snow" described above based on the moisture content and the particle diameter.

In the present embodiment, as measuring waves, there are used three types of electromagnetic waves E1 including an electromagnetic wave having a wavelength with which the amount of reflected and scattered light largely varies depending on variance of the snow thickness, an electromagnetic wave having a wavelength with which the amount of reflected and scattered light largely varies depending on variance of the moisture content, and an electromagnetic wave having a wavelength with which the amount of reflected and scattered light largely varies depending on variance of the particle diameter.

Further, it is possible to monitor the snow thickness, the moisture content, and the particle diameter highly accurately based on the features of a plurality of measuring image data (in other words, three kinds of measuring image data shown in FIG. 3 to FIG. 5 as examples) corresponding to the three types of electromagnetic waves E1. Note that a threshold about a brightness value may be set for each pixel of the receiver 18. Further, an image signal of brightness zero may be generated for a brightness value equal to or smaller than the threshold. As a result, the accuracy of monitoring based on the maximum diameter of the scattered waves E2 may be increased.

In the present embodiment, the snow thickness, the moisture content, and the particle diameter correspond to a plurality of covering material information of different types corresponding to the plurality of measuring data. Note that specific wavelength values for highly accurately monitoring the snow thickness, the moisture content, and the particle diameter may be set as necessary by means of calibration and the like.

The information calculated as snow and ice information is not limited to the snow thickness, the moisture content, and the particle diameter. Other parameters such as temperature or particle uniformity may be calculated. By setting the wavelength of the electromagnetic wave E1 as necessary, it is possible to calculate arbitrary parameters, with which the absorption property and the scattering property of the snow 3 vary, based on the feature of measuring image data.

Not only the maximum diameter of the scattered waves E2 may be used as the feature of measuring image data. Also, there may be used arbitrary features about the two-dimensional distribution of intensity (brightness) such as the location, the area size (area size of light receiving region), the shape (oblateness, roundness, etc.), the inclination (inclination of brightness) of the intensity in the light receiving region, the intensity of the center part of the light receiving region, or the average of intensity of the scattered waves E2. As a result, it is possible to monitor the snow thickness, the moisture content, and the particle diameter highly accurately.

Further, in the present embodiment, the snow and ice information generating module 32 generates snow and ice information by using a predetermined machine learning algorithm. For example, a machine learning algorithm using DNN (Deep Neural Network) such as RNN (Recurrent Neural Network), CNN (Convolutional Neural Network), or MLP (Multilayer Perceptron) is used. Another arbitrary machine learning algorithm that executes supervised learning, unsupervised learning, semi-supervised learning, reinforcement learning, or the like may be used.

For example, by constructing an AI (artificial intelligence) that executes deep learning, snow and ice information may be generated with a very high degree of accuracy. Note that features of measuring image data of the present embodiment include a feature amount defined by an operator or the like for execution of learning based on a machine learning algorithm and a feature amount extracted by an algorithm.

FIG. 10 is a table showing identification results with respect to a real snow cover. With regard to the snow quality and the snow thickness, the AI identification results are very close to the real measured values. Note that, by constructing a machine learning algorithm as necessary, it is possible to obtain identification results with a higher degree of accuracy.

With reference to FIG. 7 again, in the present embodiment, in Step 1, the calculated snow quality and snow thickness are in association with a runway condition code. In other words, a runway condition code is generated as snow and ice information. A method of making those information in association with each other is not limited. For example, the snow quality and snow thickness, which are necessary to obtain a runway condition code, may be directly calculated. Alternatively, the snow quality and snow thickness calculated in Step 1 may be converted as necessary to obtain a runway condition code. As a matter of course, a runway condition code may be obtained with reference to a parameter such as outside temperature as necessary.

Next, in Step 2, the analyzer apparatus 30 determines necessity of snow removal from the runway 1. Further, availability/unavailability of takeoff and landing at the runway 1 is determined. The processing is executed typically based on the snow quality and snow thickness calculated in Step 1 and the runway condition code.

The snow and ice information generating module 32 executes the processing of Step 2. In other words, in the present embodiment, necessity/unnecessity of snow removal, and takeoff and landing availability/unavailability information are generated as snow and ice information about the snow 3 that covers the transparent member 12 (snow that covers the runway 1). As described above, management guidance information, determination information about the flight, or the like may be generated as snow and ice information.

Note that the information indicating necessity/unnecessity of snow removal and the takeoff and landing availability/unavailability information may be directly generated based on the measuring image data obtained in Step 0, instead of the snow quality and snow thickness or the runway condition code generated in Step 1. As a matter of course, a predetermined machine learning algorithm may be used.

In Step 3, the analyzer apparatus 30 generates output data including the snow and ice information generated in Steps 1 and 2. In the present embodiment, the monitoring image generating module 33 generates the monitoring image 60 including the snow and ice information. Further, the sound data generating module 34 generates sound data including the snow and ice information. In the present embodiment, the monitoring image generating module 33 and the sound data generating module 34 function as an output module.

Figure 11:
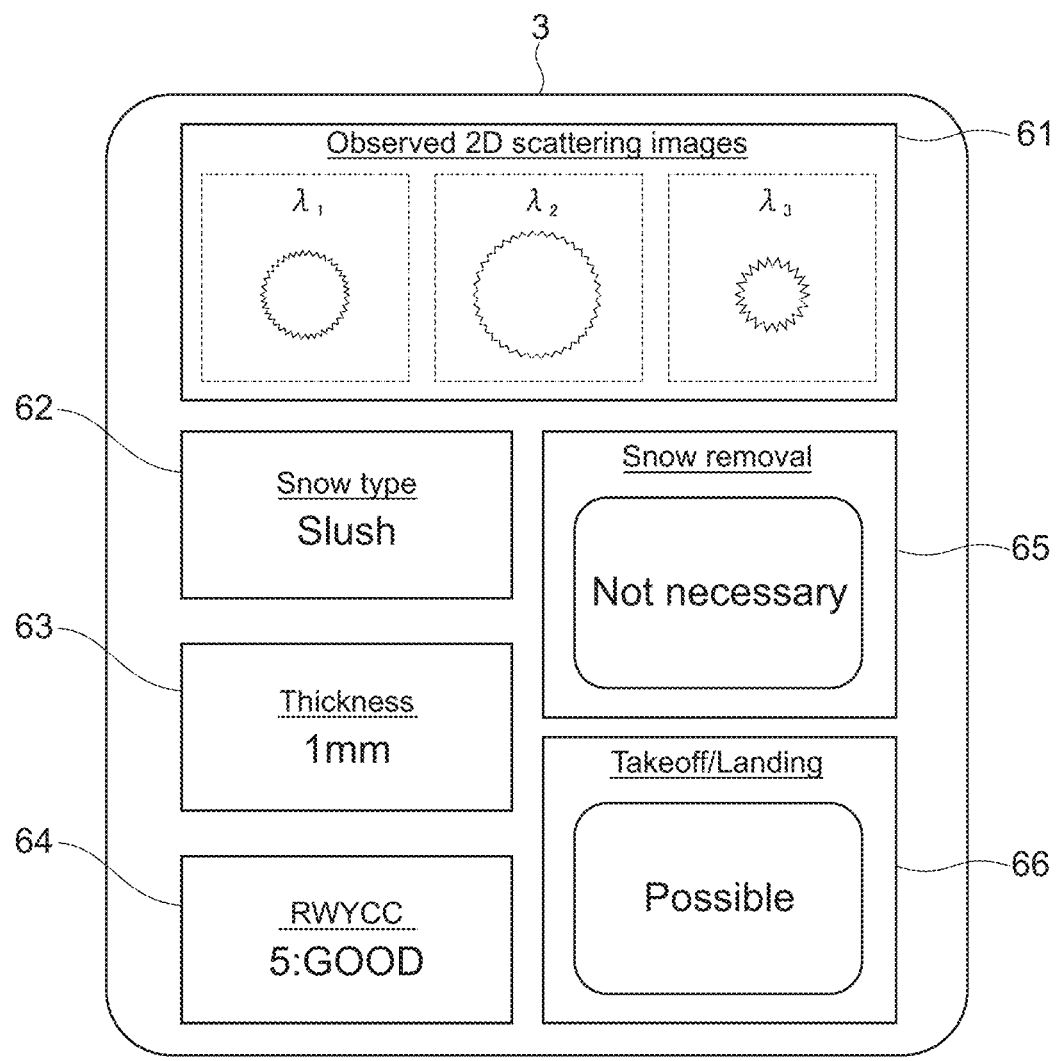
FIG. 11 A diagram schematically showing an example of a monitoring image.

FIG. 11 schematically shows an example of the monitoring image 60. The monitoring image 60 includes the measuring image data display section 61, the snow quality (snow type) display section 62, the snow thickness display section 63, the runway condition code display section 64, the snow removal necessity display section 65, and the takeoff and landing availability/unavailability display section 66.

The measuring image data display section 61 displays measuring image data sent from the monitoring apparatus 10. In the present embodiment, the three types of two-dimensional light scattering images shown in FIG. 3 to FIG. 5 as examples are displayed. The snow quality display section 62 displays the snow quality calculated in Step 1. The snow thickness display section 63 displays the snow thickness calculated in Step 1. The runway condition code display section 64 displays the runway condition code generated in Step 1.

The snow removal necessity display section 65 displays necessity/unnecessity of snow removal generated in Step 2 as snow and ice information. The takeoff and landing availability/unavailability display section 66 displays takeoff and landing availability/unavailability information generated in Step 2 as snow and ice information.

In Step 4, the monitoring image 60 is output and displayed on the display 50a that a manager 5a at an airport (the runway 1) can watch. Further, the monitoring image 60 is displayed on the display 50b that a pilot 5b of an aircraft can watch. As a matter of course, the monitoring image 60 may be displayed on the display 50c that a dispatcher 5c can watch.

As a result, with reference to the monitoring image 60, the manager 5a, the pilot 5b, and the dispatcher 5c may know the condition of the surface 2 of the runway 1 easily, and determine a management guidance or the like easily. For example, the manager 5a is capable of easily determining necessity of snow removal, and the management or the like of the runway 1 may be executed easily based on the runway condition code. Further, the pilot 5b of an aircraft is capable of easily determining availability/unavailability of takeoff and landing at the runway 1 without directly confirming the surface 2 of the runway 1. As a matter of course, for example, the pilot 5b may operate the aircraft based on the runway condition code. Further, the dispatcher 5c is capable of easily determining availability/unavailability of takeoff and landing at the runway 1. For example, the dispatcher 5c is capable of appropriately and entirely determining a measure also with reference to an on-site direct confirmation result.

Note that, in Step 4, sound data including the snow and ice information may be generated. Sounds including the snow and ice information are output via speakers in a control room, a cockpit, a ground manager room, and the like. As a result, the manager 5a, the pilot 5b, and the dispatcher 5c are capable of selecting a measure appropriately depending on the condition of the surface 2 of the runway 1.

Note that the content of the monitoring image 60 is not limited, and an arbitrary image (GUI) may be generated and displayed. Further, snow and ice information included in the monitoring image 60 is not limited, and arbitrary snow and ice information may be displayed.

For example, it is not limited to the case where the common monitoring image 60 is generated. Instead, a manager monitoring image supplied to the manager 5a, a pilot monitoring image supplied to the pilot 5b, and a dispatcher monitoring image supplied to the dispatcher 5c may be generated independently. As a matter of course, the monitoring image 60 may be customized arbitrarily with options of the manager 5a, the pilot 5b, and the dispatcher 5c. In other words, a user may be capable of selecting snow and ice information that the user wants to watch as necessary.

Further, depending on an environment and a condition, the content (texts, marks, and images) of the displayed snow and ice information, and its arrangement, size, colors, and the like may be changed manually or automatically. The same applies to sound data. Depending on the environment, the condition, generated snow and ice information, and the like, the content of sound may be changed as necessary. For example, an alert, message information, and the like may be determined as necessary, and sound data may be generated as necessary and output.

Note that, in many cases, as shown in FIG. 1 as an example, the plurality of monitoring apparatuses 10 are arranged at a plurality of locations of the runway 1. In this case, for example, the monitoring image 60 shown in FIG. 11 as an example may be generated for each monitoring apparatus 10. As a result, a user may know the surface condition at each location on the runway 1.

Further, snow and ice information generated based on measuring data measured by the respective monitoring apparatuses 10 may be integrated, and the monitoring image 60 including the integrated snow and ice information may be generated. For example, the surface conditions (snow and ice information) of the respective locations may be integrated, and the snow quality, the snow thickness, the runway condition code, necessity/unnecessity of snow removal, and takeoff and landing availability/unavailability may be generated and displayed. As a result, a user may know the condition of the entire runway 1.

A method of integrating a plurality of snow and ice information is not limited. Information estimated based on the snow quality and the snow thickness of the respective locations on average is displayed. Alternatively, information may be weighed depending on the locations on which the monitoring apparatuses 10 are arranged. For example, the measuring data of the monitoring apparatus 10 arranged at the center of the runway 1 and snow and ice information generate based on that are weighed larger. Meanwhile, the measuring data and the like of the monitoring apparatus 10 arranged at the end of the runway 1 is weighed smaller. Such processing is available.

Further, snow and ice information may be generated and displayed for each area of the runway 1. Where one monitoring apparatus 10 is arranged in each area, snow and ice information is generated based on measuring data sent from the monitoring apparatus 10, and displayed on the monitoring image 60. Where the plurality of monitoring apparatuses 10 are arranged in each area, for example, measuring data or snow and ice information is integrated and displayed on the monitoring image 60.

Alternatively, from snow and ice information generated for the respective locations, the information of the worst condition may be selected and displayed on the monitoring image 60. For example, let's say that snow and ice information, which indicates that it is necessary to remove snow and takeoff and landing is unavailable, is generated for one location. In this case, even if snow and ice information, which indicates that it is unnecessary to remove snow and takeoff and landing is available, is generate for a plurality of other locations, the snow and ice information, which indicates that it is necessary to remove snow and takeoff and landing is unavailable, is displayed. Such processing is available.

[Prediction of Measuring Data and Snow and Ice Information]

In the present embodiment, it is possible to generate predictive information indicating a predictive condition of the surface 2 of the runway 1 being a measured surface based on at least one of the measuring data (measuring image data) obtained from the monitoring apparatus 10 and the generated snow and ice information. For example, it is possible to generate predictive information indicating predictive future transition of snow quality, snow thickness, a runway condition code, necessity/unnecessity of snow removal, and takeoff and landing availability/unavailability.

The predictive information is generated based on, for example, history information as of now of the measuring data, the snow and ice information, and the like stored in the database 40 of FIG. 1, predetermined predictive modelling, predictive data, and the like. For example, it is possible to generate predictive information including the snow quality and the snow thickness after 10 minutes, after 30 minutes, after 60 minutes, and the like based on weather information and the like obtained via a weather radar in an airport. As a matter of course, an arbitrary machine learning algorithm may be used to generate predictive information. Since the predictive information is generated, it is possible to determine the airport management guidance, the flight plan, and the like with a high degree of accuracy.

Note that predictive measuring data about the surface 2 of the runway 1 being a measured surface may be generated based on the feature of the measuring data obtained from the monitoring apparatus 10. For example, predictive measuring data indicating a predictive change of a two-dimensional light scattering image shown in FIG. 3 to FIG. 5 as examples is generated. Further, predictive information may be generated based on the predictive measuring data.

As described above, the snow and ice monitoring system 100 of the present embodiment generates snow and ice information based on the feature of the measuring data of the surface 2 of the runway 1 being a measured surface. As a result, it is possible to monitor the condition of the surface 2 of the runway 1 highly accurately, and use the monitoring result effectively.

For example, as the monitoring result, it is possible to provide various analysis results such as snow quality, snow thickness, a runway condition code, necessity/unnecessity of snow removal, or takeoff and landing availability/unavailability. So a user may know the very accurate condition of the surface 2 of the runway 1.

Further, the snow cover condition of the surface 2 of the runway 1, takeoff and landing availability/unavailability, necessity of snow removal, and the like are displayed as the monitoring image 60 in real time for the airport manager 5a, the pilot 5b, the dispatcher 5c, and the like. As a result, it is possible to avoid overrun accidents, flight delay, and cancellation resulting from a snow cover. So flight safety may be increased and operational efficiency may be increased. Further, by displaying the predictive condition of the runway surface, the operational efficiency may be further increased.

Further, in the present embodiment, the monitoring apparatus 10 is buried below the runway 1. So, without becoming an obstacle for aircrafts, it is possible to monitor a specific condition of a snow cover regarding a depth and quality of the entire runway while inhibiting a breakage or the like due to collisions of external foreign materials and the like.

Second Embodiment

A snow and ice monitoring system according to a second embodiment of the present invention will be described. In the following description, the configuration and operations similar to those of the snow and ice monitoring system 100 described in the first embodiment will be omitted or made simple.

Figure 12:
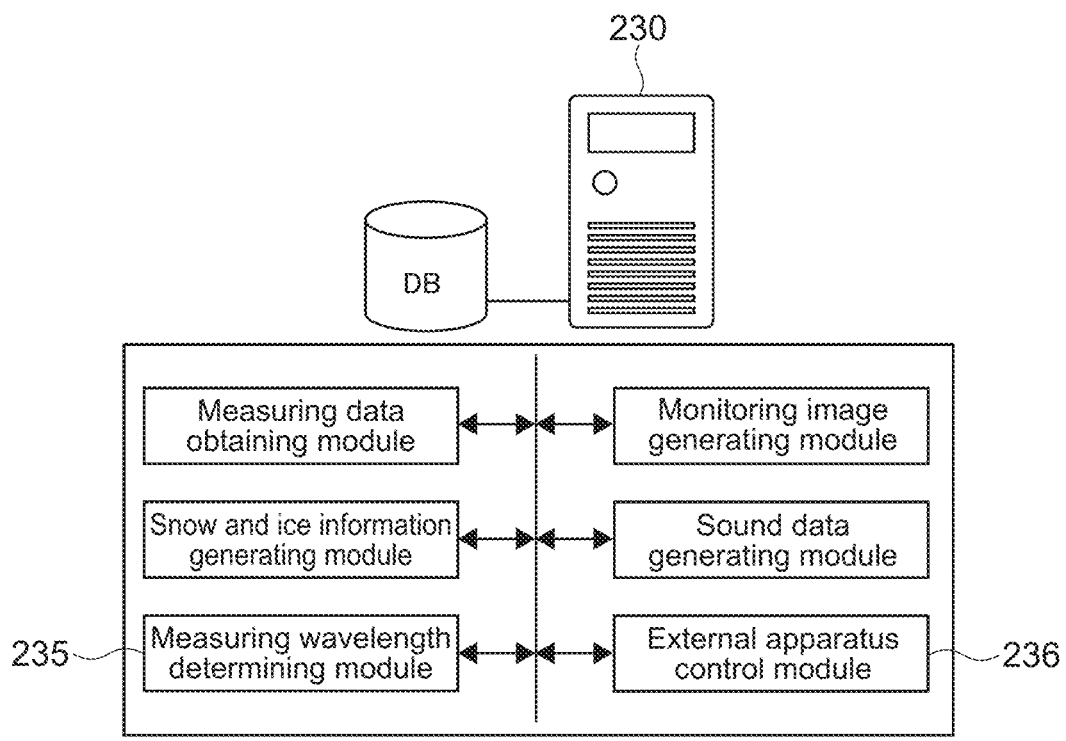
FIG. 12 A block diagram schematically showing a configuration example of an analyzer apparatus of a second embodiment.

FIG. 12 is a block diagram showing a functional configuration example of the analyzer apparatus 230 of the present embodiment. The analyzer apparatus 230 includes, as functional blocks, the measuring wavelength determining module 235 and the external apparatus control module 236.

The measuring wavelength determining module 235 is capable of determining the property of a measuring wave emitted from the transmitter 17 of the monitoring apparatus 10 based on at least one of measuring data (measuring image data) obtained from the monitoring apparatus 10 and generated snow and ice information. In the present embodiment, the measuring wavelength determining module 235 corresponds to a setting module.

For example, where the transmitter 17 is capable of emitting the electromagnetic waves E1 having a plurality of wavelengths, a wavelength used for measuring is selected out of the plurality of wavelengths. As described above, the electromagnetic waves E1 having the first to third wavelengths λ1 to λ3 having different absorption, scattering, and reflection properties are emitted. In this case, the first wavelength λ1, the second wavelength λ2, and the third wavelength λ3 may be selected out of the plurality of wavelengths as necessary and determined.

Alternatively, where the transmitter 17 is capable of continuously changing the wavelength of the electromagnetic waves E1 within a predetermined wavelength band, the first wavelength λ1, the second wavelength λ2, and the third wavelength λ3 are determined as necessary within the wavelength band.

Further, a wavelength necessary for measuring may be selected out of the first wavelength λ1, the second wavelength λ2, and the third wavelength λ3 corresponding to the measured snow quality and snow thickness. For example, one of the first wavelength λ1, the second wavelength λ2, and the third wavelength λ3 is selected as necessary as the wavelength of the electromagnetic wave E1 so as to obtain desired snow and ice information depending on the condition of the snow 3. Such processing is available.

Further, an operation may be input in a predetermined computer or the like such as a PC by the manager 5a, an expert operator, or the like, and the property (e.g., wavelength of the electromagnetic wave E1) of the measuring wave emitted from the transmitter 17 may be thereby set via the operation. In other words, the property of the measuring wave may be changed manually.

A specific example of setting the wavelength of the electromagnetic wave E1 will be described. For example, the wavelength of the electromagnetic wave E1 may be set based on a predictive snow cover. For example, information indicating increase of snowfall is generated as predictive information. Then a wavelength suitable for snow thickness observation is preselected (e.g., visible wavelength for entering snow layer deeper). For example, predictive information indicating that it will be raining in several minutes is generated when there is a snow cover. Then a wavelength suitable for water content (moisture content) measuring is preselected.

Further, it is possible to set the wavelength of the electromagnetic wave E1 based on the snow thickness result. For example, let's say that the snow thickness is measured with a certain wavelength for the first time, and it is determined that the snow thickness of the snow cover is small (thin) at that time. In this case, it is necessary to measure not the snow thickness but rather the snow quality of the top layer with an emphasis. So the measuring is shifted to measuring with a wavelength such as near-infrared effective to determine the particle diameter. Where it is determined that the snow thickness is somewhat large (thick), not a near-infrared wavelength but a visible wavelength or the like for entering a snow layer deeper is rather selected to measure the snow thickness with an emphasis.

Further, is is possible to set the wavelength of the electromagnetic wave E1 based on the result of a water content. For example, let's say that the water content is measured with a certain wavelength for the first time, and it is determined that the water content is somewhat high at that time. In this case, there may be an error resulting from the water content in the optical observation of the snow quality. So a wavelength effective to measure the water content and a wavelength effective to measure the snow quality are selected at the same time to thereby correct the error. Where it is determined that the water content has a level which does not lead to an error, only wavelength effective to observe the snow quality is selected to measure the snow quality with an emphasis.

Further, the confidence level of the generated snow and ice information is determined. Where the confidence level is lower than a predetermined threshold, the wavelength of the electromagnetic waves E1 is changed. Such processing is available.

As described above, the property of the measuring wave is variable. So it is possible to monitor the condition of the surface 2 of the runway 1 highly accurately, and use the monitoring result effectively. Note that the property of the measuring wave is not limited to the wavelength of the electromagnetic wave E1. Alternatively, arbitrary properties of the electromagnetic wave E1 such as an intensity, a polarization condition, or pulse intervals may be determined. Further, an arbitrary machine learning algorithm may be used to set the property of the measuring wave.

The intensity of the electromagnetic wave E1 and the gain of the receiver 18 may be selectable manually or automatically based on measuring data, snow and ice information, and the like. For example, where measuring data has an over range (saturation) section, the intensity (brightness) of the electromagnetic wave E1 is reduced and, in addition, the gain of the receiver 18 is reduced. Further, where the entire measuring data is smaller than a predetermined threshold, the intensity of the electromagnetic wave E1 (brightness) is increased and the gain of the receiver 18 is reduced. In this manner, the intensity and the gain is appropriately changed based on the trend of the measuring data, and the optimized measuring is enabled.

Further, the intensity of the electromagnetic wave E1 and the gain of the receiver 18 may be changed based on exterior weather information and the like. For example, where the exterior environment light is strong and the measuring data value is large, the intensity of the electromagnetic wave E1 (brightness) is increased and the gain of the receiver 18 is reduced to thereby increase the signal-to-noise ratio of data. Such processing is available.

The external apparatus control module 236 generates control information for controlling an external apparatus based on at least one of the measuring data (measuring image data) obtained from the monitoring apparatus 10 and the generated snow and ice information. For example, the external apparatus control module 236 is capable of transmitting signals for controlling an external device depending on the environment, the condition, and the measuring data and the snow and ice information processed by the analyzer apparatus 230.

As a result, for example, an alarm for calling attention to a snow cover may be started in real time immediately, and a lamp for informing of necessity of snow removal may be turned on in real time immediately. The next action may be started appropriately. In the present embodiment, the external apparatus control module 236 corresponds to a control information generating module.

Other Embodiments

The present invention is not limited to the aforementioned embodiments, and other various embodiments are available.

Figure 13:
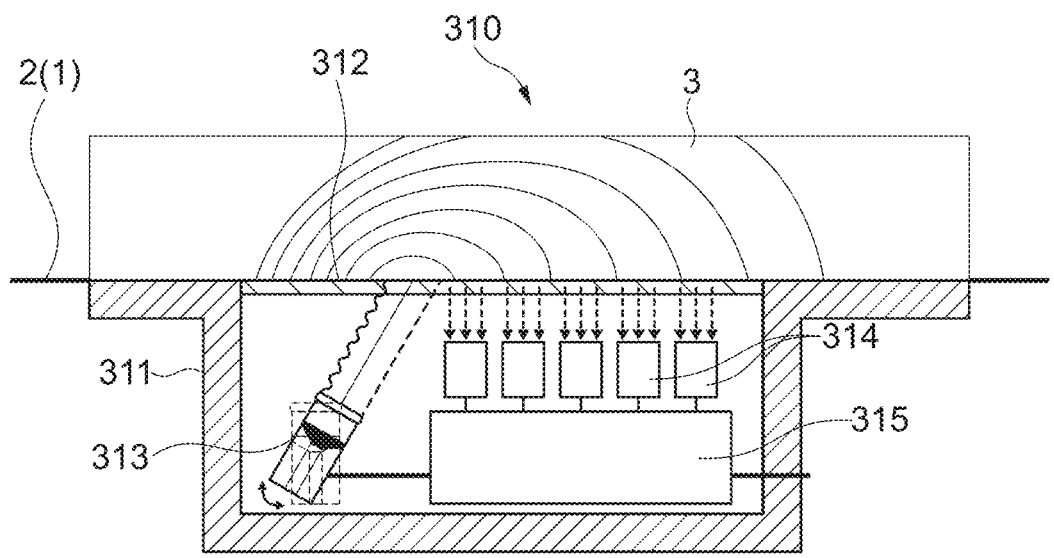
FIG. 13 A diagram schematically showing a configuration example of a monitoring apparatus of another embodiment.

FIG. 13 schematically shows a configuration example of a monitoring apparatus of another embodiment. The monitoring apparatus 310 includes the case unit 311, the transparent member 312, the transmission unit 313, the plurality of reception units 314, and the control block 315.

The plurality of reception units 314 is arranged such that the reception units 314 are arrayed in five lines starting from the transmission unit 313. Since the plurality of reception units 314 is arranged in this manner, it is possible to measure the snow quality and the snow thickness of a wider range of the snow 3. It is possible to monitor the condition of the surface 2 of the runway 1 highly accurately.

The applicability of the present technology is not limited to monitoring of snow and ice on a runway of an airport. The present technology is applicable to the monitoring of the condition of surfaces of other structures such as a road, a bridge, or a building. Further, the present technology is not limited to takeoff and landing of aircrafts, and is applicable to determination about drive of other movable objects such as vehicles. Further, the present technology is applicable to arbitrary covering materials such as snow, ice, water, dirt, or volcanic ash. In other words, the present technology is applicable to various industrial fields.

For example, the monitoring apparatus is provided at a road surface. Then the surface condition of a snow cover, sands, and the like on the road surface is displayed for a road manager person, and the road manager person may manage the road based on the surface condition. For example, the road manager person may determine whether it is necessary to close the road and select an alternative path easily, for example. Further, a monitoring image and the like are displayed on a display panel of a general automobile to thereby inform a driver of the condition of the road surface in real time via a network and the like, for example. As a result, accidents may be avoided, and the traffic efficiency may be improved. Further, the combination of the surface condition in real time and predictive modelling such as a future snowfall condition is applicable as the road surface condition predictive display. As a result, the traffic efficiency may be further improved.

Further, based on a covering amount, a predictive covering amount, and the like of volcanic ash as the surface condition of a runway of an airport, necessity of runway cleaning and takeoff and landing availability/unavailability may be informed of. As a matter of course, the present technology is applicable to a taxiway of an airport.

As covering material information, information about a layer structure of a covering material may be generated. For example, variance of the quality of snow or volcanic ash in the thickness direction and the layer condition of each layer may be generated as covering material information.

In the aforementioned embodiment, a measured surface is irradiated with a plurality of electromagnetic waves having different wavelengths, and a plurality of measuring data corresponding to the plurality of electromagnetic waves is obtained. The embodiment is not limited to that. Alternatively, a measured surface may be irradiated with a plurality of electromagnetic waves having different wavelength bands or wavelength widths, and a plurality of measuring data corresponding to the plurality of electromagnetic waves may be obtained. For example, wide band laser light, narrow band laser light, and the like are emitted as a plurality of measuring waves (the electromagnetic waves E1), and a plurality of measuring data corresponding to those laser lights is generated. Further, a plurality of covering material information corresponding to a plurality of measuring data may be generated.

As a matter of course, one type of electromagnetic wave such as an electromagnetic wave having a predetermined wavelength (one wavelength), an electromagnetic wave having a predetermined wavelength band, or an electromagnetic wave having a predetermined wavelength width may be emitted. Then covering material information may be generated based on one type of obtained measuring data.

A monitoring apparatus may include a transmission unit capable of emitting a linear polarization electromagnetic wave, and a reception unit capable of detecting a linear polarization electromagnetic wave in a certain direction. For example, the polarization direction of the emitted electromagnetic wave and the polarization direction of the detected electromagnetic wave are set in a relationship of the approximate cross Nicol, in which those polarization directions are approximately orthogonal to each other.

As a result, the positive reflective component of the electromagnetic waves E1 reflected by the bottom surface or the top surface of the transparent member may be eliminated. As a result, electromagnetic waves (scattered waves) having information only about covering materials (snow, ice, dust particles, water, dirt, etc.) on the transparent member may be obtained. As a result, for example, by detecting scattered waves having different wavelengths, it is possible to obtain the depth and the quality, which are separated, highly accurately, and monitor the condition about the depth and the quality of the covering material in detail.

The monitoring apparatus may be a mobile apparatus. Then it is possible to bring the monitoring apparatus into a land or the like near a snow mountain or a volcano, for example, and set up the monitoring apparatus there. Further, it is possible to highly accurately monitor the condition of a desired surface based on measuring data sent from the monitoring apparatus. For example, it is possible to generate information such as possibility of occurrence of an avalanche or possibility of occurrence of a volcanic eruption as covering material information or its predictive information.

In the aforementioned embodiment, the monitoring apparatus is an apparatus that emits electromagnetic waves and thereby generates measuring data. The embodiment is not limited to that. Alternatively, the monitoring apparatus may be another sensor device such as a temperature sensor capable of measuring outside temperature or the like as measuring data. In this case, a temperature being the measuring data may be used as snow and ice information as it is.

Further, as the monitoring apparatus, an apparatus that outputs text data as measuring data may be used. For example, according to an applicable configuration, text data is generated based on measuring data obtained by using an arbitrary measure method, the text data is output as measuring text data. Alternatively, arbitrary data may be output as measuring data. Similar to the aforementioned plurality of measuring image data, a plurality of measuring text data may be output, and a plurality of covering material information corresponding to the plurality of measuring text data may be generated.

In the aforementioned example, the analyzer apparatus is described as an embodiment of the information processing apparatus of the present technology. The embodiment is not limited to that. Alternatively, a cloud server may execute the information processing method of the present technology. Alternatively, a plurality of computers work in association with each other communicably to execute the information processing method of the present technology.

Execution of the information processing method and the program of the present technology by the computer system includes both the case where a single computer generates covering material information and executes other processing and the case where different computers execute the respective processing. Further, the case where a predetermined computer executes the respective processing includes the case where the predetermined computer causes another computer to execute a part or all of the respective processing and obtains the results.

In other words, the information processing method and the program of the present technology is applicable to a cloud computing configuration in which a plurality of apparatuses shares and executes one function in cooperation via a network.

At least two characteristic parts out of the characteristic parts of the aforementioned present invention may be combined. In other words, the various characteristic parts described in the respective embodiments may be combined arbitrarily irrespective of difference of the respective embodiments. Further, the aforementioned various effects are merely examples and not the limitations. Further, other effects may be obtained.

REFERENCE SIGNS LIST

E1 electromagnetic wave
E2 electromagnetic wave (scattered wave)
1 runway
2 surface
3 snow
10, 310 monitoring apparatus
30, 230 analyzer apparatus
31 measuring data obtaining module
32 snow and ice information generating module
33 monitoring image generating module
34 sound data generating module
50, 50a, 50b, 50c display
60 monitoring image
100 snow and ice monitoring system
235 measuring wavelength determining module
236 external apparatus control module

The invention claimed is:

1. A monitoring system, comprising:
a monitoring apparatus including:
 a transparent member having a first surface that is a measured surface and a second surface opposite to the first surface;
 a transmitter that emits one or more types of first electromagnetic wave to the second surface of the transparent member; and
 a receiver that detects a second electromagnetic wave emitted from the second surface in accordance with emission of the first electromagnetic wave; and
a computer comprising software modules stored thereon that are executable by a processor of the computer, the software modules including:
 a generating module that generates covering material information about a covering material that covers the first surface based on a detection result of the second electromagnetic wave detected by the monitoring apparatus; and
 a setting module that sets at least one of a wavelength of the first electromagnetic wave, a wavelength band, a wavelength width, an intensity, a polarization condition, and pulse intervals based on at least one of the detection result of the second electromagnetic wave and the covering material information.

2. The monitoring system according to claim 1, wherein the generating module generates the covering material information based on a predetermined machine learning algorithm.

3. The monitoring system according to claim 1, wherein the software modules further include a control information generating module that generates control information for controlling an external apparatus based on at least one of the detection result of the second electromagnetic wave and the covering material information.

4. The monitoring system according to claim 1, wherein the setting module sets at least one of the wavelength of the first electromagnetic wave, the wavelength band, the wavelength width, the intensity, the polarization condition, and the pulse intervals based on the covering material information in accordance with a covering condition of the covering material on the first surface.

5. The monitoring system according to claim 1, wherein the computer determines a confidence level of the generated covering material information, and
wherein the transmitter changes at least one of the wavelength of the first electromagnetic wave, the wavelength band, the wavelength width, the intensity, the polarization condition, and the pulse intervals in a case where the confidence level of the covering material information is smaller than a predetermined threshold.

6. The monitoring system according to claim 1, wherein the setting module sets at least one of the wavelength of the first electromagnetic wave, the wavelength band, the wavelength width, the intensity, the polarization condition, and the pulse intervals based on a user instruction or a predetermined machine learning algorithm.

7. The monitoring system according to claim 1, wherein the first electromagnetic wave has a predetermined polarization condition, and
wherein the second electromagnetic wave is a polarization component of an electromagnetic wave emitted from the second surface, which is defined based on the polarization condition of the first electromagnetic wave.

8. The monitoring system according to claim 7, wherein the first electromagnetic wave is a linear polarization wave having a first polarization direction, and
wherein the second electromagnetic wave is a linear polarization wave having a second polarization direction approximately orthogonal to the first polarization direction.

9. The monitoring system according to claim 1, wherein the covering material information includes at least one of a type, a thickness, a density, a particle diameter, a moisture content, a temperature, a cover distribution, a friction coefficient, a particle uniformity, slipperiness index information, and an evaluation value based on a predetermined criterion of the covering material.

10. The monitoring system according to claim 9, wherein the evaluation value based on the predetermined criterion includes a runway condition code defined by International Civil Aviation Organization.

11. The monitoring system according to claim 1,
wherein the software modules further include an output module that outputs output data including the covering material information, and
wherein the output data includes at least one of text data, image data, and sound data including the covering material information.

12. The monitoring system according to claim 11, wherein the covering material that covers the first surface includes snow that covers a runway surface, and
wherein the output module outputs the output data, the output data including at least one of a thickness, a type, a density, a particle diameter, a moisture content, a temperature, a cover distribution, a friction coefficient, a particle uniformity, and slipperiness information of the snow that covers the runway surface, a runway condition code defined by International Civil Aviation Organization, necessity/unnecessity of snow removal, and takeoff and landing availability/unavailability information.

13. The monitoring system according to claim 1, wherein the generating module generates predictive information that predicts a condition of the first surface based on at least one of the detection result of the second electromagnetic wave and the covering material information, and
wherein the setting module sets the at least one of the wavelength of the first electromagnetic wave, the wavelength band, the wavelength width, the intensity, the polarization condition, and the pulse intervals based on the predictive information.

14. The monitoring system according to claim 13, wherein the predictive information includes prediction of snowfall on the first surface, and
wherein the setting module sets the wavelength of the first electromagnetic wave to be a visible wavelength for measuring the snow thickness in a case where the predictive information indicating increase of the snowfall is generated.

15. The monitoring system according to claim 13, wherein the predictive information includes prediction of rainfall on the first surface, and
wherein the setting module sets the wavelength of the first electromagnetic wave to be a wavelength for measuring the water content in a case where the predictive information indicating that the rainfall will occur is generated when there is a snow cover on the first surface.

16. The monitoring system according to claim 1, wherein the covering material information includes at least one of a snow thickness, a snow quality, and a water content of snow that covers the first surface, and
wherein the setting module sets at least one of the wavelength of the first electromagnetic wave, the wavelength band, the wavelength width, the intensity, the polarization condition, and the pulse intervals based on at least one of the snow thickness, the snow quality, and the water content.

17. The monitoring system according to claim 16, wherein the setting module sets the wavelength of the first electromagnetic wave to be a visible wavelength in a case where the snow thickness is larger than a predetermined threshold and sets the wavelength of the first electromagnetic wave to be a near-infrared wavelength in a case where the snow thickness is smaller than the predetermined threshold.

18. The monitoring system according to claim 16, wherein the setting module sets the wavelength of the first electromagnetic wave to be a wavelength for measuring each of the snow quality and the water content in a case where the water content is larger than a predetermined threshold and sets the wavelength of the first electromagnetic wave to be a wavelength for measuring the snow quality in a case where the water content is smaller than the predetermined threshold.

19. An information processing method executable by a computer system that is communicably connected to a monitoring apparatus that comprises:
a transparent member having a first surface that is measured surface and a second surface opposite to the first surface;
a transmitter that emits one or more types of first electromagnetic wave to the second surface of the transparent member; and
a receiver that detects a second electromagnetic wave emitted from the second surface in accordance with emission of the first electromagnetic wave,
the information processing method comprising:
generating covering material information about a covering material that covers the first surface based on a detection result of the second electromagnetic wave detected by the monitoring apparatus; and
setting at least one of a wavelength of the first electromagnetic wave, a wavelength band, a wavelength width, an intensity, a polarization condition, and pulse intervals based on at least one of the detection result of the second electromagnetic wave and the covering material information.

20. A non-transitory computer readable recording medium that stores a program that causes a computer system that is communicably connected to a monitoring apparatus to execute an information processing method, the monitoring apparatus comprising:
a transparent member having a first surface that is a measured surface and a second surface opposite to the first surface;
a transmitter that emits one or more types of first electromagnetic wave to the second surface of the transparent member; and
a receiver that detects a second electromagnetic wave emitted from the second surface in accordance with emission of the first electromagnetic wave,
the information processing method comprising:
generating covering material information about a covering material that covers the first surface based on a detection result of the second electromagnetic wave detected by the monitoring apparatus; and
setting at least one of a wavelength of the first electromagnetic wave, a wavelength band, a wavelength width, an intensity, a polarization condition, and pulse intervals based on at least one of the detection result of the second electromagnetic wave and the covering material information.

* * * * *